April 10, 1928.

C. E. B. SMITH 1,665,227

ELECTRIC BRAKE OPERATING MECHANISM

Original Filed Nov. 5, 1921   3 Sheets-Sheet 1

Inventor
Charles E. B. Smith
by Geyer & Popp
Attorneys

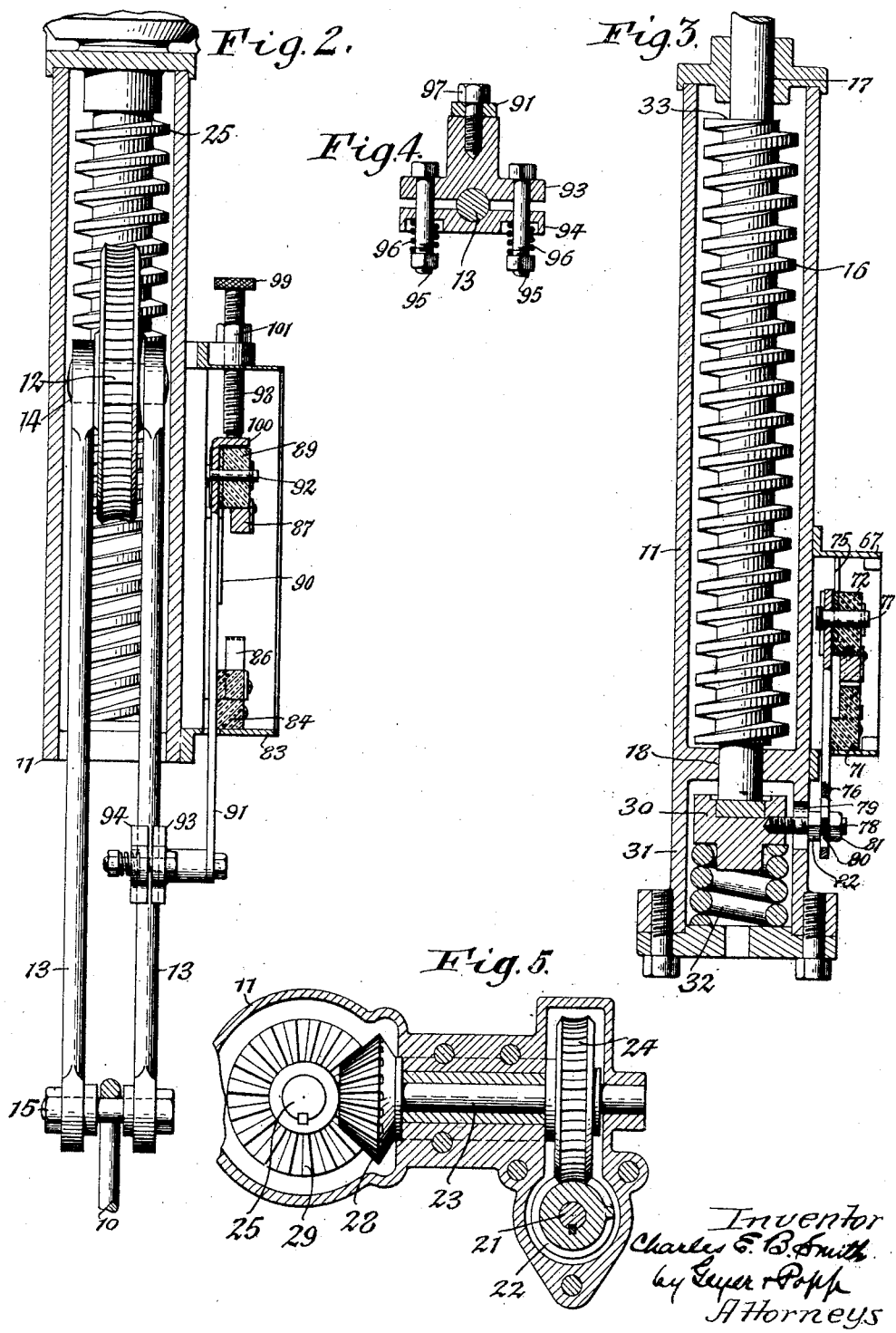

Patented Apr. 10, 1928.

1,665,227

UNITED STATES PATENT OFFICE.

CHARLES E. B. SMITH, OF BUFFALO, NEW YORK, ASSIGNOR, BY MESNE ASSIGNMENTS, TO JOHN H. WEIDEMILLER, OF BUFFALO, NEW YORK.

ELECTRIC BRAKE-OPERATING MECHANISM.

Application filed November 5, 1921, Serial No. 513,179. Renewed September 10, 1927.

This invention relates to an electric brake mechanism which is more particularly designed for use on electrically propelled railway cars although the same may also be used for other purposes.

One of the objects of this invention is to provide a brake of this character in which the operation of the brake motor will be arrested after applying and releasing or relaxing the brakes without undue arching at the terminals or contacts of the magnetic switches and thus reduce the cost and annoyance of frequent repairs.

Another object of this invention is to so construct this brake mechanism that any slack produced in the same either by wear on the brake shoes or parts associated therewith, stretching of any parts, or other cause will be automatically taken up and thus cause the brakes to be always retained in such a position that they will clear the wheels and not drag on the same and still be sufficiently close thereto in order to promptly engage the wheels when a braking effect is required.

A further object of this invention is to permit of readily adjusting the pressure which is exerted by the brake shoes against the wheels to suit the particular requirements under which the car is operating.

Other objects of this invention are to improve the details of construction of this electric brake mechanism as will presently appear.

Figure 1:
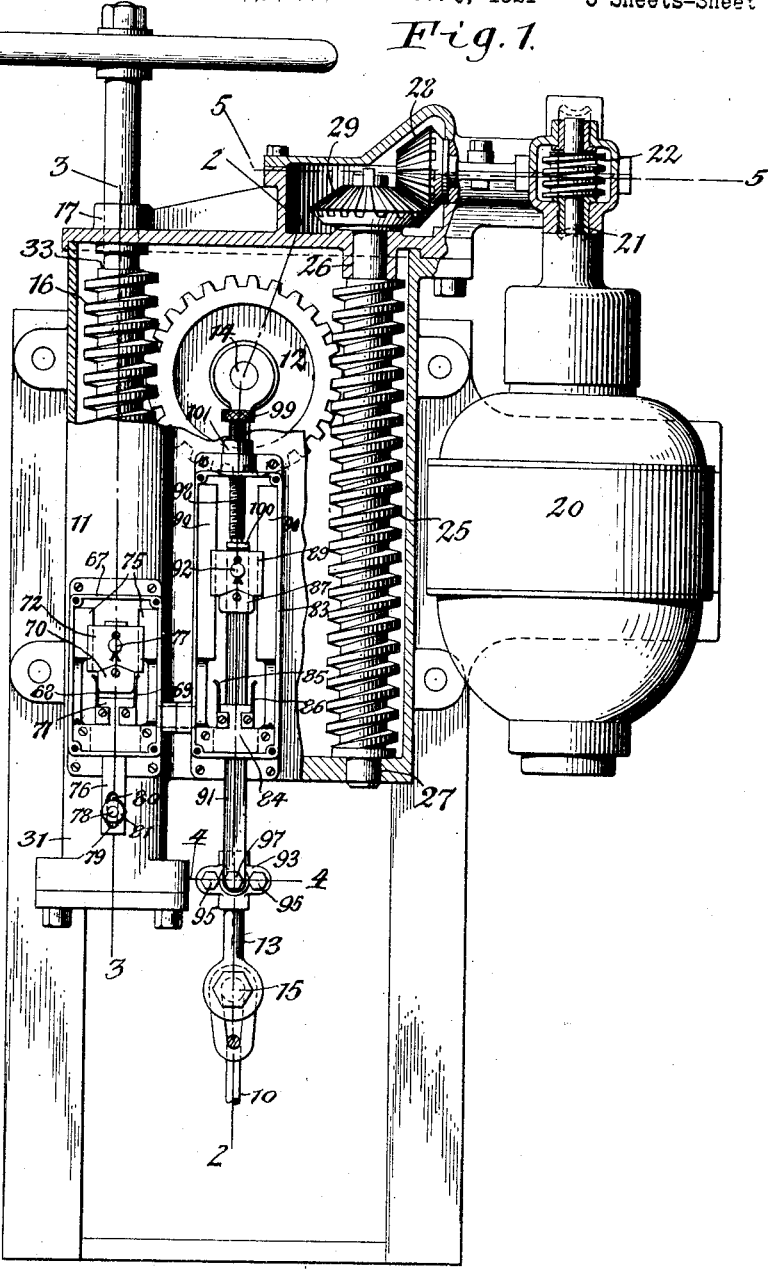
Figure 6:
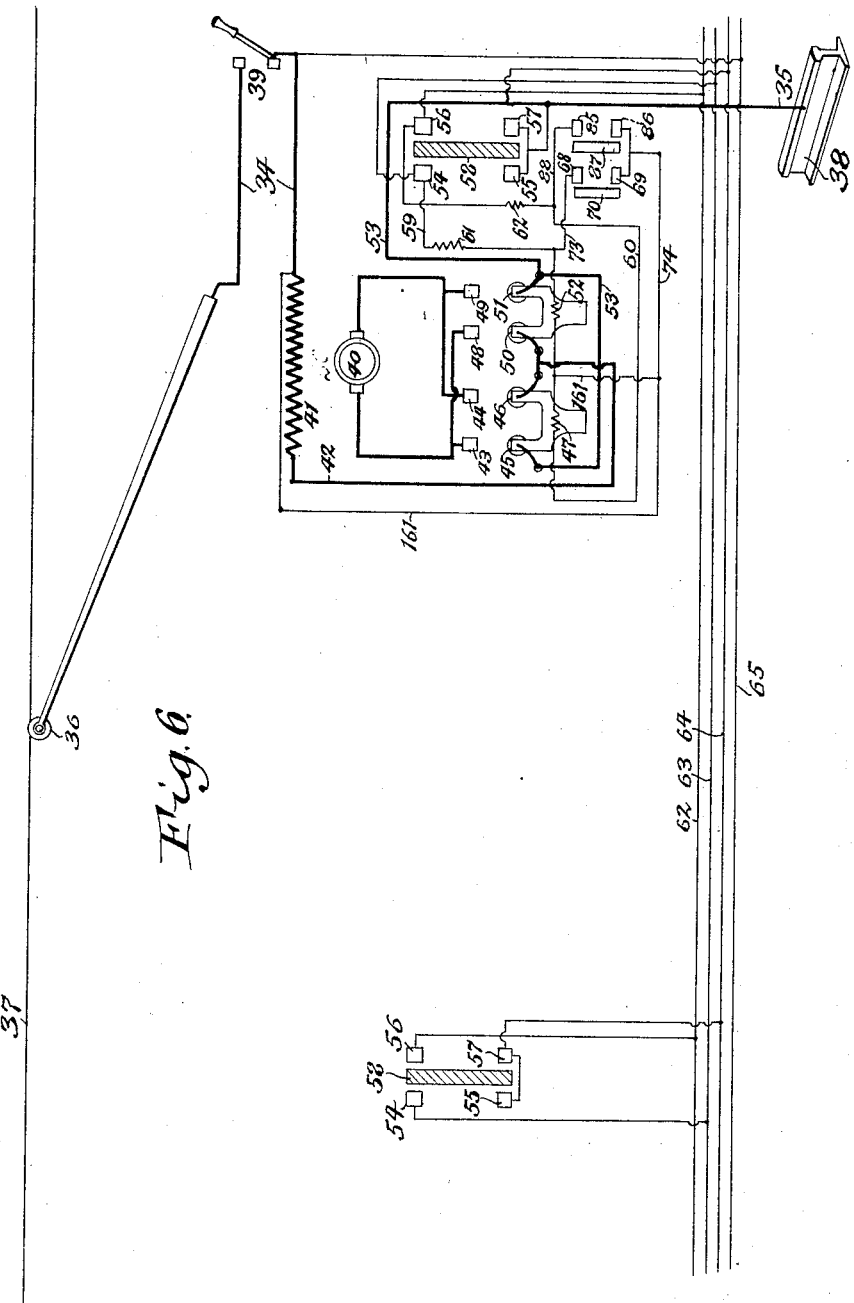

In the accompanying drawings: Figure 1 is a front elevation, partly in section, of a suitable form of brake mechanism embodying my invention. Figures 2 and 3 are vertical sections, on an enlarged scale, of the same taken on the correspondingly numbered lines in Fig. 1. Figures 4 and 5 are horizontal sections, on an enlarged scale, taken on lines 4—4 and 5—5, Fig. 1, respectively. Figure 6 is a diagrammatic view of the electric circuits of the electric brake mechanism containing my improvements.

Similar characters of reference indicate like parts in the several figures.

This brake operating mechanism is designed to work in conjunction with any type of brake rigging now in common use and it is deemed sufficient for the present purpose to simply indicate a portion 10 of the chain or line with which the brake operating mechanism is connected for pulling or releasing the same and thus cause the shoes of the brake rigging to be either engaged with the wheels of the running gear or disengaged therefrom.

Although my improvements may be embodied in an electric brake operating mechanism which may be variously constructed, the same is shown in the present instance embodied in a mechanism of this character which is so organized that the brakes may be operated either by electric motor power or by hand power, or by a combination of both of these powers.

So far as the brake operating mechanism itself is concerned, the same, as shown in the drawings, is constructed as follows:

11 represents a stationary main frame which may be mounted on any suitable part of the car and which is constructed in the form of a casing upon the interior and exterior of which the working parts of the brake mechanism are mounted. Movable vertically in the central part of this casing is a floating gear wheel or pinion 12 which acts as a traveling lever and which may be guided in its vertical movement on the casing in any suitable manner. This floating gear wheel may be operatively connected with the chain 10 of the brake rigging in any approved manner, for example, by two upright pull links 13 arranged on opposite sides of the floating gear wheel within the casing and connected at their upper ends with opposite ends of the axle 14 on which the floating gear is mounted, and a transverse coupling bolt 15 which passes through the chain 10 and has its opposite ends connected with the lower ends of these links below the casing, as shown in Figs. 1 and 2. On one side of the floating gear wheel the same is in mesh with a hand power operated worm 16 which is arranged in the casing and journaled at its upper and lower ends in bearings 17, 18 on the casing so as to be capable of not only turning therein but also moving vertically therein lengthwise of its axis. This worm may be turned by hand power by any suitable means, such as the hand wheel 19 secured to the upper end of the same.

The preferred means for moving the floating gear wheel bodily vertically by motor power which are shown in the drawings, comprise an electric reversible motor 20 of any desired commercial type mounted on the exterior of the main frame or casing and having its power shaft 21 provided with a driving worm 22, an intermediate shaft 23 journaled horizontally in bearings on the upper part of the main frame and having a driven worm wheel 24 which meshes with the driving worm 22, an upright motor power driven worm 25 arranged in the casing and journaled at its upper and lower ends in bearings 26, 27, so as to be capable of turning but held against lengthwise movement and having its intermediate part intermeshing with the floating gear wheel diametrically opposite to where the latter is engaged by said hand power operated worm, and a pair of intermeshing bevel pinions 28, 29 secured respectively, to the intermediate shaft and the upper end of the motor power operated worm 25.

Upon conducting a current through the motor in one direction the same will turn forwardly and cause the power operated worm to rotate the floating gear wheel so that the latter will roll up on the hand power operated worm as a rack, and thereby produce a forward motion or pull on the chain 10 which has the effect of applying the brake shoes to the wheels of the car. A similar effect is produced upon turning the hand power operated worm forwardly by means of the hand wheel during which time the turning action of the floating gear wheel causes the same to climb upwardly on the motor power operated worm as a rack. If desired the floating gear wheel may be raised bodily for applying the brake by turning the hand wheel and the electric motor forwardly at the same time. In like manner the floating gear wheel may be lowered for releasing the brake by turning the hand wheel and electric motor backward simultaneously, or by turning backwardly either the hand wheel independently of the motor, or turning backwardly the motor independently of the hand wheel.

My improved controlling mechanism which is associated with the parts above described for the purpose of automatically arresting the operation of the electric motor when the brakes have been applied or released and preventing overloading of the brake mechanism is constructed as follows:

30 represents a vertically movable follower which is arranged in a tubular downward extension 31 of the casing and engages with the lower end of the hand power operated worm so as to serve as a step bearing for the same, as shown in Fig. 3. This follower together with the worm resting thereon is yieldingly held in an elevated position by a controlling or brake pressure limit spring 32 arranged in the casing extension 31 and engaging its upper end with the underside of said follower and its lower end with the bottom of said extension, the upward movement of said follower and hand operated worm under the action of the controlling spring being limited in any suitable manner, for instance by engaging the top of the follower with the bottom of the main casing, or by engaging the shoulder 33 at the upper end of the thread of the hand operated worm with the top of the main casing or by utilizing both of these means simultaneously for this purpose. The tension of the controlling spring is such that the same is practically rigid and supports the hand operated worm in its elevated position during practically the entire stroke of the brake mechanism upon applying the brakes, but during the last part of this stroke, when the maximum pressure for which the brakes have been set is about to be reached, the controlling spring yields and permits the follower and hand operated worm to descend under the continued application of power and this downward yielding movement is utilized to automatically stop the further forward rotation of the motor and limit the pressure with which the brakes are applied so that no breakage will occur, and this movement is also utilized to set the mechanism in readiness for subsequently turning the motor backwardly and releasing the brakes. The last portion of the downward movement of the floating gear wheel and associated parts upon releasing the brakes is utilized to arrest the backward rotation of the motor and set the parts in readiness for subsequently applying the brakes.

The electric current for operating the motor may be derived from any available source but in the case of an electrically propelled car the same source is utilized by connecting the circuits of the mechanism which controls the brake motor with the lead lines 34, 35 supplying the car propelling motor. In this instance the line 34 leads to the trolley wheel 36 engaging the trolley wire 37 which is connected with one side of the electric source, while the other line 35 leads to the track or rail 38 upon which the car runs and which is connected with the other side of the electric source, said lead line 34 being provided with a hand operated safety or cut-out switch 39 of unusual construction, as shown in Fig. 6.

41 represents the field winding or coil of the reversible electric brake motor 20 and 40 the armature of the motor. One end of the field winding is connected with the lead line 34 and the other end of the same is connected by a wire 42 with an electrically operated reversing switch mechanism whereby the electric current may be conducted either forwardly or backwardly through the armature winding for causing the motor to either turn forwardly for applying the brakes, or backwardly for releasing the brakes. This reversing switch mechanism preferably comprises a forward double pole magnetic switch and a backward double pole magnetic switch. The forward magnetic switch has two fixed contacts 43, 44 connected with the brushes of armature 40, two movable contacts 45, 46, adapted to move into and out of engagement with the contact 43, 44, respectively, and an electro-magnet for moving the contacts 45, 46 into engagement with the contacts 43, 44 and having an operating coil 47. The backward magnetic switch has two fixed contacts 48, 49 which are connected with the brushes of the armature reversely to the connections between the same and the fixed contacts 43, 44, of the forward magnet switch, two movable contacts 50, 51 adapted to move into and out of engagement with the contacts 48, 49, respectively, and an electro-magnet for moving the contacts 50, 51 into engagement with the contacts 48, 49, and having an operating coil 52. The two movable contacts 46 and 50 of these magnetic switches are adapted to engage the fixed contacts 44, 48 leading in one direction to opposite brushes of the armature and are connected by the wire 42 with the field winding 41 while the movable contacts 45, 51, of these magnetic switches are adapted to engage the fixed contacts 43, 49 leading in a reverse direction to the opposite brushes of the armature and are connected by a wire 53 with the lead line 35 connected with the ground formed by the track or rail 38.

The brake mechanism may be controlled from more than one point, for instance, at the front and rear ends of an electrically propelled car, or in each car of a train in which case additional switches corresponding to the controller switch having parts corresponding to the contacts 54, 55, 56, 57 and 58 are provided. One such an additional switch is shown, for example in Fig. 6, the corresponding contacts of the several switches being connected by trunk lines 62, 63, 64. This figure also shows an extra trunk line 65 for supplying the propelling motor or motors of a car or train with electric current or for other purposes.

The electric current is caused to flow in one direction or the other through the armature winding for turning the brake motor either forwardly or backwardly by a hand operated reversing switch comprising two fixed forward contacts 54, 55, two backward fixed contacts 56, 57, and a movable contact 58 adapted in one position to be disengaged from the contacts 54, 55, 56, 57, in another position to engage the contacts 54, 55, and in another position to engage the contacts 56, 57. The contacts 55, 57 are connected with the grounded wire 35, and the contacts 54 and 56 are connected individually by wires 59, 60, with one end of each of the switch operating coils 47, 52 while the opposite ends of these coils are connected by wire 161 with the lead line 34. The wires 59, 60 preferably include resistances 61, 62, respectively, to limit the current which can be taken by the coils 47, 52.

Upon manually moving the contact 58 into engagement with the contacts 54, 55 the first effect is to close the circuit which includes the magnetic coil 52 during which time the current flows from the lead line 34 successively through wire 161, coil 52, wire 59, resistance 61, contacts 54, 58, 55, wire 35, to ground 38. The instant this occurs the contacts 50, 51 are moved into engagement with the contacts 48, 49, by the electro-magnet of which the coil 52 forms a part, thereby causing the electric current to flow in one direction through the armature winding of the motor and cause the same to turn forward for applying the brakes, the current at the time passing successively from lead line 34 through field winding 41, wire 42, contacts 50, 48, through armature winding 40, contacts 49, 51, wires 53, and 35, to ground 38.

Upon moving the manually operated contact 58 of the controller switch to its neutral position the circuit through the magnet coil 52 is broken so that the latter releases the contacts 50 and 51 and permits the same to be disengaged from the contacts 48, 49, in a manner well known in this type of switch, whereby the circuit through the armature 40 is broken and the forward motion of the motor and its brake applying operation is arrested.

When it is desired to reverse the motor or turn the same backwardly for releasing or relaxing the brakes the hand operated contact 58 of the controlling switch is moved into engagement with the contacts 56, 57 thereby closing the electric circuit through the coil 47 and causing the magnetic switch of which the same forms a part to engage the contacts 45, 46 with the contacts 43, 44, and thereby direct the electric current through the armature 40 in a direction reverse to that previously described, whereby the motor is caused to turn backwardly and release the brakes. When thus causing the motor to turn backwardly in this manner, the current first passes from the lead line 34 successively through the wire 161, coil 47, wire 60, resistance 62, contacts 56, 58, 57 and wire 35 to ground 38, and then when the magnet coil 47 operates and engages contacts 45, 46, with contacts 43, 44 the current splits and the greater part passes from the lead wire 34 successively through the field winding 41, wire 42, contacts 46, 44, armature 40, contacts 43, 45, wires 53 and 35 to ground 38. Stoppage of the motor may again be effected in the manner previously described by moving the contact 38 into its neutral position, as shown in Fig. 6.

Means are provided independently of the manual control switch which automatically limits or arrests the operation of the motor when a predetermined pressure has been reached in the application of the brakes and thus avoid over loading and possible burning out the same, which means in their preferred form are constructed as follows:

67 represents a switch casing which is mounted on the lower front part of the main casing adjacent to the hand power operated worm and which contains the contacts of the limit switch whereby excessive braking pressure is avoided. These contacts consist in this instance of two fixed contacts 68, 69 which are mounted on an insulated block 71 within the switch casing 67 and a movable contact 70 adapted to move into and out of engagement with said fixed contacts and mounted on a vertically movable slide or carriage 72 of insulating material. The contact 68 is connected by wire 73 with the same end of the switch coil 52 with which the wire 59 connects, and the contact 69 is connected with the opposite end of this coil by wire 74. The slide or carriage 72 is guided on vertical ways 75 in this switch casing and is caused to rise and fall in unison with the follower 30 and the hand power operated worm 16. For this purpose this slide and follower may be connected in any suitable manner, for instance, as shown in Figs. 1 and 3, this may be accomplished by an upright shifting bar or rod 76 which is connected at its upper end with the slide 72 on the rear side thereof by a pin 77 while its lower end is adjustably connected with the follower by a stud bolt 78 extending through a vertical slot 79 in the front side of the casing extension and secured at its rear end to the follower while its front end is arranged in a vertical slot 80 in the lower end of this shifting bar and is clamped thereto by clamping screw nuts 81, 82 arranged on the stud bolt and engaging with the front and rear sides of the shifting bar.

During the initial and intermediate part of the forward rotary movement of the motor while aplying the brake shoes to the wheels, the brake pressure limiting switch is open and the switch coil 52 is taking the maximum electric current, so that the contacts 48, 49, 50, 51 are held in engagement and the motor is turning forwardly and applying the brakes. But when the pressure on the brakes reaches the predetermined load at which the same has been set, then the resistance of the load limit spring 32 is overcome and the latter is compressed downwardly by the follower 30 and the worm 16 above the same, which movement is transmitted by the shifting bar 76 to the slide 72 so that the contact 70 thereon engages the contacts 68, 69 and closes the shunt around the switch coil 52. The instant this occurs the latter is short circuited and weakened to such an extent that the same immediately releases the contacts 50, 51, and permits them to disengage from the contact 48, 49, thereby stopping the further forward rotation of the motor and preventing any further pressure or overload on the brake rigging. This limit switch remains in this closed position until after the initial part of the subsequent releasing movement of the brakes has been effected and the follower 30 has been raised by the resilience of the load limit spring 32 as the brake pressure is subsequently reduced. By adjusting the slide 72 up or down relatively to the follower 30 the degree of pressure which is applied to the wheels by the brake shoes may be varied, inasmuch as an upward adjustment of the slide will further separate the fixed contacts 68, 69 and the movable contact 70 of the brake pressure limit switch and therefore prolong the forward movement of the motor and increase the brake pressure before the motor is arrested, while upon lowering the movable contact 70 so as to shorten the gap between the same and the fixed contacts 68, 69, this switch will be closed earlier which results in a reduction in the pressure of the brakes when applying the same.

Means are also provided for automatically arresting the backward rotation of the motor, independently of the operation of the manually controlled switch 56, 57, 58 when the brakes have been released the required extent to prevent dragging, which means are preferably so organized that they also operate to automatically take up any undue slack in the brake rigging by reason of wear on the brake shoes and other causes. In their preferred form these means are constructed as follows:

83 represents the enclosing casing of a brake release limit switch which is mounted on the lower front part of the main casing adjacent to the front pull link 13. Within the lower part of this switch casing is arranged an insulating block 84 on which are mounted two fixed contacts 85, 86, which are adapted to be engaged by a movable contact 87. The contact 85 is connected by a wire 88 with the wire 60 leading to one end of the switch coil 47 and the contact 86 is connected with the wire 74 leading to the opposite end of this coil. The movable contact 87 is mounted on a slide or carriage 89 of insulating material which is guided on vertical ways 90 in the casing 83 and moves in unison with the pull chain 10 of the brake rigging and associated parts. In the preferred construction this movement of the contact 87 is obtained by means which comprise an upright shifting bar or rod 91 passing through an opening in the bottom of the switch casing 83 and having its upper end arranged in rear of the slide 89 and connected therewith by a pin 92 and the lower end of said shifting bar being frictionally connected with the front pull link 13 by two clamping plates 93, 94 engaging with opposite sides of this link, coupling bolts 95 passing through corresponding ends of these plates on opposite sides of the respective link 13 and each bolt bearing with its head at one end against the outer side of one of said plates, a spring 96 surrounding each bolt 95 and bearing at one end against the nut thereof and at its other end against the adjacent plate so as to produce a frictional grip of said plates on said link, and a coupling bolt 97 connecting the lower end of said shifting bar 91 with the front clamping plate, as shown in Figs. 1, 2 and 4.

When the attendant closes the manual switch contacts 56, 57, 58 for releasing the brakes the motor 20 turns backwardly so as to release the brakes and the movable contact 87 descends until it engages the fixed contacts 85, 86 of the release limit switch thereby producing a shunt or short circuit around the switch coil 47 and weakening the same to such an extent as to render it inoperative. The instant this occurs the movable contacts 45, 46, are released and disengaged from the fixed contacts 43, 44, and breaks the circuit of the motor so that the same stops turning backward, thereby arresting the releasing action movement of the brakes.

It will now be apparent that both the application and the releasing movement of the motor which operates the brake is automatically limited as predetermined, notwithstanding that the operator may hold the main controlling switch either in the brake applying or releasing positions longer than is necessary. Obviously partial application as well as partial release of the brakes is also possible by momentarily closing the control switch contact 58 either on its brake applying or its brake releasing side.

The means for automatically taking up slack in the brake rigging includes an abutment 98 which preferably has the form of a screw and is arranged vertically in a threaded opening in the top of the casing 83 and provided at its upper end with a head 99 for turning the same while its lower end is adapted to be engaged by a lug 100 projecting forwardly from the upper end of the shifting bar 91.

When the brake rigging is in normal condition and no undue slack exists in the same the reciprocating movement of the shifting bar 91 is such that the same does not change its position on the respective pull link 13 and the movable contact 87 upon engaging the contacts 85, 86 stops the backward rotation of the motor and during an application of the brakes the head 99 of the shifting bar engages lightly with the lower end of the screw 98 without bringing about any changed relation between the parts. When however an undue amount of slack occurs in the brake rigging and the pull chain 10 and associated parts as a consequence are moved up a correspondingly greater distance beyond the normal, then the shifting bar 91 is restrained from taking part in this continued or excess upward movement of the respective link 13, chain 10 and wheel 12. This causes the link 13 to slip upwardly on the bar 91 while the latter is at rest to an extent proportionate to the undue slack in the brake rigging caused by wear on the brake shoes, stretch in the brake members, or other causes. When now the brakes are subsequently released and the shifting bar 91 descends with pull chain 10 and link 13, the latter do not go down as far as they did previously inasmuch as the movable contact 87 will engage the fixed contacts 85, 86 sooner than before and thus advance the take up mechanism in the same measure as the excess slack which has developed in the brake rigging. The excess slack in the brake rigging is taken up in this manner whenever it occurs and keeps pace with the gradual wear on the shoes or other parts. This of course understood that before the taking up capacity of the shifting bar 91 is exhausted the worn shoes of the brake rigging will be replaced and when this is done the frictional connection between the shifting bar 91 and the link 13 will be incidentally slipped upwardly on this link in the act of again pulling down the chain 10 to a position which will permit replacement of the worn shoes by new ones.

By constructing the abutment 98 in the form of a screw the same can be readily adjusted to suit the amount of travel or length of stroke in the brake rigging to effect an application of the brakes and a release of the same and maintain the requisite slack in the same before an automatic take-up of the undue slack in the same takes place, thereby enabling the brake operating mechanism to be readily adapted to meet different conditions and requirements and still insure effect and prompt operation of the brakes. After adjusting this abutment screw 98 the same may be held against displacement by a jam nut 101 arranged thereon and engaging with the top of the casing 83.

It is of course obvious that in the operation of this brake mechanism the brake applying limit switch is opened during the initial part of the brake releasing stroke and the brake releasing limit switch is opened during the initial part of the brake applying stroke.

It will be noted from the foregoing description that the motor which operates the brake rigging is arranged in the main electric circuit, that the coils which operate the magnetic pole reversing switches of the motor are arranged in shunt circuit which is connected with the main circuit around the electric motor, the brake applying limit switch is arranged in a shunt circuit which connects with opposite ends of one of the operating coils, and the brake releasing or relaxing limit switch is arranged in a shunt circuit which is connected with opposite ends of the other operating coil.

It will now be clear that the brake applying limit switch and the brake releasing limit switch operate alternately, the former being always closed at a definite predetermined pressure of the brake rigging, while the latter is automatically adjusted to take up wear in the brake rigging, but in any event the motor is stopped automatically in either direction and therefore is not liable to burn out regardless of when the attendant opens the hand operated switches after the same have been closed for applying or releasing the brakes.

In addition to exerting a powerful and efficient braking effect this brake mechanism relieves the operator of the necessity of exercising care in applying the brakes or releasing the same inasmuch as the automatically operated limit switches predetermine the pressure at which the brakes are applied and also the amount of slack in the brake rigging when released.

Furthermore, by short circuiting the coils of the magnetic switches which control the forward and backward movement of the motor undue arcing in the circuits of these coils is avoided, thereby materially reducing the possibility of fire.

I claim as my invention:

1. An electric brake mechanism comprising an electric motor adapted to be operatively connected with a brake rigging, a main electric circuit which includes said motor and a magnetic switch having an operating coil, a shunt circuit around said motor which includes said operating coil and a hand operated switch, and a shunt circuit around said operating coil and containing a limit switch which is responsive to the pressure of applying the brakes and operates to short circuit said coil and stop the motor when a predetermined brake pressure is reached.

2. An electric brake mechanism comprising an electric motor adapted to be operatively connected with a brake rigging, a main electric circuit which includes said motor and a magnetic switch having an operating coil, a shunt circuit around said motor which includes said operating coil and a hand operated switch, and a shunt circuit around said operating coil and containing an adjustable limit switch which is responsive to the pressure of applying the brakes and operates to short circuit said coil and stop the motor when a predetermined brake pressure is reached.

3. An electric brake mechanism comprising an electric motor operatively connected with a brake rigging, a longitudinally movable member which is operatively related to said brake rigging and motor and which is adapted to be moved lengthwise by the pressure of said brake rigging, a spring which holds said member against longitudinal movement during the first part of the brake applying operation but yields and permits said member to move when a predetermined pressure has been reached during the final part of the brake applying operation, a main electric circuit which includes said motor and a magnetically operated switch having an operating coil, a shunt circuit around said motor which includes said operating coil and a manually operated switch, and a shunt circuit around said operating coil and including a limit switch which is associated with said movable member and adapted to close the circuit around said operating coil and stop said motor when the predetermined brake pressure has been reached.

4. An electric brake mechanism comprising an electric motor adapted to be operatively connected with a brake rigging, a longitudinally movable member operatively connected with said motor and to be shifted lengthwise when the pressure applied to the brake rigging has reached a predetermined limit, a spring which resists the movement of said member in response to said brake applying pressure, a follower interposed between said spring and said member, and electric means for controlling the operation of said motor including an electric switch having a stationary contact, a movable contact adapted to be engaged and disengaged with said stationary contact, a slide carrying said movable contact, a shifting rod connected at one end with said slide and provided at its other end with a longitudinal slot, a bolt arranged on said follower and extending through said slot, and nuts arranged on said bolt and engaging with opposite sides of said bar.

5. An electric brake mechanism comprising an electric motor adapted to be operatively connected with a brake rigging, a main electric circuit which includes said motor and a magnetic switch having an operating coil, a shunt circuit around said motor which includes said operating coil and a hand operated switch, and a shunt circuit around said operating coil and containing a limit switch which is operated in unison with the relaxing movement of said brake rigging and operates to short circuit said coil and stop the motor when the brake rigging has been released a predetermined extent.

6. An electric brake mechanism comprising an electric motor adapted to be operatively connected with a brake rigging, a movable member operatively associated with said motor and adapted to be moved backward by said motor when said brake rigging is released, a main electric circuit which includes said motor and a magnetic switch having an operating coil and a hand operated switch, a shunt circuit around said motor containing said operating coil, and a brake release limit switch, said last mentioned switch having a stationary contact and a movable contact which is moved in unison with said movable member.

7. An electric brake mechanism comprising an electric motor adapted to be operatively connected with a brake rigging, and an electrical mechanism which controls said motor and prevents the accumulation of slack in the rigging by arresting the rotation of the motor at varying points in the rotation of the same to compensate for wear in the brake rigging.

8. An electric brake mechanism comprising an electric motor, a reciprocating member operated by motion derived from said motor and adapted to be connected with a brake rigging, and means for preventing the accumulation of slack in the rigging by arresting the rotation of the motor at varying points in the rotation of the same to compensate for wear in the brake rigging while changing the terminals effecting forward and backward rotations of the motor for applying and releasing the brakes, which means comprise an electric limit switch having a fixed contact, a movable contact adapted to engage and disengage with said fixed contact, and an automatically adjustable connection between said movable contact and said reciprocating member.

9. An electric brake mechanism comprising an electric motor, a reciprocating member operated by motion derived from said motor and adapted to be connected with a brake rigging, and means for preventing the accumulation of slack in the rigging by arresting the rotation of the motor at varying points in the rotation of the same to compensate for wear in the brake rigging while changing the terminals effecting forward and backward rotations of the motor for applying and releasing the brakes, which means comprise an electric limit switch having a fixed contact, a movable contact adapted to engage and disengage with said fixed contact, a frictional connection between said movable contact and said reciprocating member, and an abutment which arrests the movement of said movable contact and permits said reciprocating member to move independently thereof in the direction in which the brakes are applied and thereby cause the movable contact to be shifted relatively to said reciprocating member and change the stopping point in the rotation of the motor in either direction.

10. An electric brake mechanism comprising an electric motor, a reciprocating member operated by motion derived from said motor and adapted to be connected with a brake rigging, and means for preventing the accumulation of slack in the rigging by arresting the rotation of the motor at varying points in the rotation of the same to compensate for wear in the brake rigging while changing the terminals effecting forward and backward rotations of the motor for applying and releasing the brakes, which means comprise an electric limit switch having a fixed contact, a movable contact adapted to engage and disengage with said fixed contact, a slide carrying the movable contact, and an automatically adjustable connection between said slide and said reciprocating member.

11. An electric brake mechanism comprising an electric motor, a reciprocating member operated by motion derived from said motor and adapted to be connected with a brake rigging, and means for preventing the accumulation of slack in the rigging by arresting the rotation of the motor at varying points in the rotation of the same to compensate for wear in the brake rigging while changing the terminals effecting forward and backward rotations of the motor for applying and releasing the brakes, which means comprise an electric limit switch having a fixed contact, a movable contact adapted to engage and disengage with said fixed contact, a slide carrying the movable contact, and an automatically adjustable connection between said slide and said reciprocating member comprising a shifting bar connected with the slide, two clamping plates arranged on opposite sides of said reciprocating member and one of them connected with said bar, two bolts passing through said plates on opposite sides of said reciprocating member and bearing at one end against one of said plates, and springs interposed between the other clamping plate and the opposite ends of said bolts, and an abutment adapted to limit the movement of said movable contact and permit said reciprocating member to move independently in the direction for applying the brakes when an undue slack in the brake rigging occurs.

12. An electric brake mechanism comprising an electric motor, a reciprocating member operated by motion derived from said motor and adapted to be connected with a brake rigging, and means for preventing the accumulation of slack in the rigging by arresting the rotation of the motor at varying points in the rotation of the same to compensate for wear in the brake rigging while changing the terminals effecting forward and backward rotations of the motor for applying and releasing the brakes, which means comprise an electric limit switch having a fixed contact, a movable contact adapted to engage and disengage with said fixed contact, a slide carrying the movable contact, and an automatically adjustable connection between said slide and said reciprocating member comprising a shifting bar connected with the slide, two clamping plates arranged on opposite sides of said reciprocating member and one of them connected with said bar, two bolts passing through said plates on opposite sides of said reciprocating member and bearing at one end against one of said plates, and springs interposed between the other clamping plate and the opposite ends of said bolts, and an adjustable abutment screw adapted to limit the movement of said movable contact and permit said reciprocating member to move independently in the direction for applying the brakes when an undue slack in the brake rigging occurs.

13. An electric brake mechanism comprising an electric motor, means operatively associated with said motor and brake rigging and having one carrying member which moves in one direction when applying the brakes and another carrying member which moves in another direction when releasing the brakes, a main electric circuit which includes said motor and two magnetic switches of opposite polarity and two hand operated switches, and in circuit with each of said magnetic switches, and each magnetic switch having an operating coil, two shunt circuits connected with said main circuit, one around each of said operating coils, a brake applying limit switch arranged in the shunt circuit around one of said operating coils and adapted to be closed by the movement of one of said carrying members during an application of the brakes, and a brake releasing limit switch arranged in the shunt circuit around the other operating coil and adapted to be closed by the movement of the other of said carrying members during a release of the brakes.

CHARLES E. B. SMITH.